United States Patent [19]

Maurer

[11] Patent Number: 5,213,183
[45] Date of Patent: May 25, 1993

[54] CONTROL DEVICE FOR A VALVE WITH A SPIRAL SPRING

[75] Inventor: Daniel P. Maurer, Vernouillet, France

[73] Assignee: Societe Anonyme Mecafrance, France

[21] Appl. No.: 791,203

[22] Filed: Nov. 13, 1991

[30] Foreign Application Priority Data

Nov. 14, 1990 [FR] France .................................. 90 14136
Oct. 11, 1991 [FR] France .................................. 91 12520

[51] Int. Cl.⁵ ............................................. F16D 57/00
[52] U.S. Cl. ..................................... 188/290; 185/39; 185/45
[58] Field of Search .................... 188/290, 293, 296; 251/235, 242, 243, 244, 54, 313; 116/117, 52, 58, 61, 75, 85, DIG. 17; 185/39, 45; 92/120, 122; 267/272

[56] References Cited

U.S. PATENT DOCUMENTS

| 3,422,843 | 10/1966 | Blackman et al. | |
|---|---|---|---|
| 4,697,673 | 10/1987 | Omata | 188/290 X |
| 4,768,630 | 9/1988 | Aubry et al. | 188/290 |
| 4,842,106 | 6/1989 | Ludwig et al. | 188/200 X |

FOREIGN PATENT DOCUMENTS 1031070 5/1958 Fed. Rep. of Germany .
2640024 6/1990 France .

Primary Examiner—Matthew C. Graham
Assistant Examiner—Lee W. Young

[57] ABSTRACT

Control device for a valve provided with a spiral spring whose release brings about rotation of the drive shaft of the stopper of the valve. Rotation of the auxiliary shaft of the control device is dependent upon a shock absorbing device, wherein rotation of the auxiliary shaft drives a rotating piston arranged in a sealed housing containing a viscous fluid.

17 Claims, 2 Drawing Sheets

CONTROL DEVICE FOR A VALVE WITH A SPIRAL SPRING

BACKGROUND OF THE INVENTION

1. Field of the Invention

The present invention relates to improvements made in control devices for valves of the type in which the drive shaft of the stopper is controlled in one direction by an operating lever, and in the other direction by the release of a spiral spring.

2. Discussion of Background Material

A device which illustrates the state of the art is described in French published application No. 2,640,024. In such a device, the spiral spring is enclosed in a casing constituted of two portions, fixed on the body of the valve, one of the ends of the springs being fixed to the shaft driven by the operating lever, and the other being fixed to the casing.

Experience has shown with such a device that the opening and closing operations are too quick. It has also been noted, in particular, that during closing, under the action of the spring, shocks are capable of bringing about detrimental results.

SUMMARY OF THE INVENTION

It is an object of the present invention to overcome the disadvantages of conventional devices by providing a device wherein rotation of the control shaft of a stopper is dependent on a shock absorbing device.

According to one embodiment, the drive shaft is affixed to a rotating piston enclosed in a sealed compartment which includes a viscous fluid, such as grease. This compartment defines, in cooperation with the piston, two variable volume chambers communicating with each other by the intermediary of an opening with a reduced section.

BRIEF DESCRIPTION OF THE DRAWINGS

The present invention will be better understood in light of the description that follows with reference to the annexed drawings, given as non-limiting examples, in which.

DETAILED DESCRIPTION OF THE PREFERRED EMBODIMENTS

Figure 1:
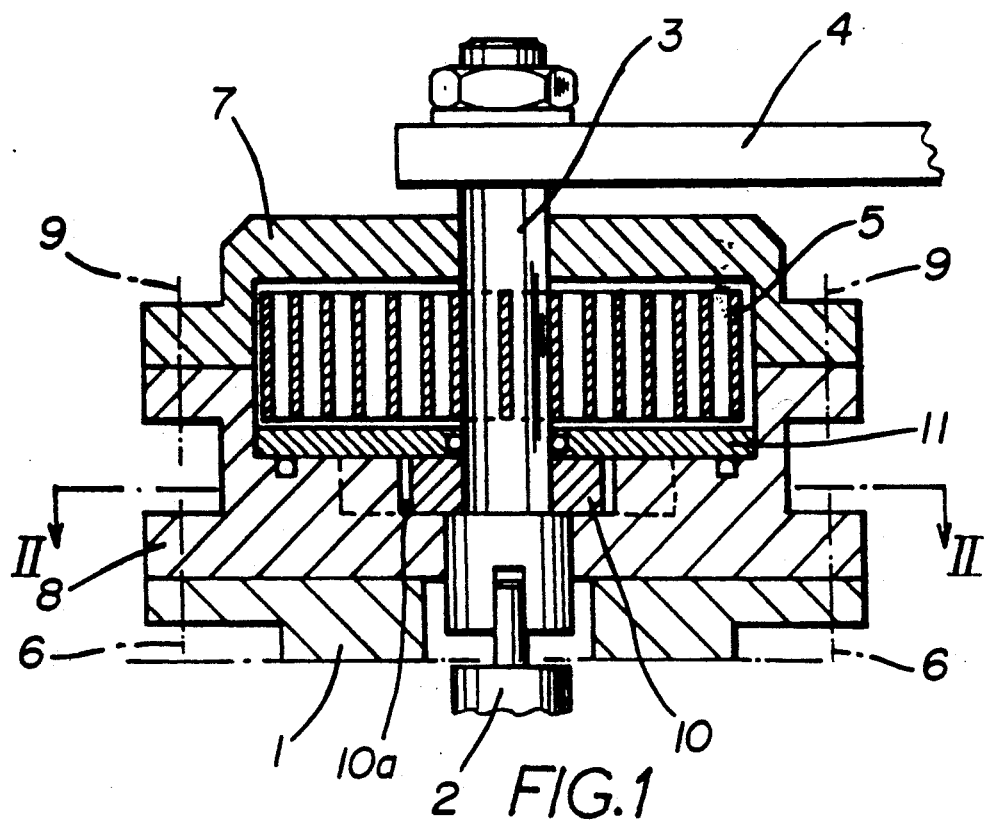
FIG. 1 is a vertical sectional view of a device according to the invention.

By referring to the drawings, and in accordance with a first embodiment, reference numeral 1 diagrammatically represents the body of the valve, and reference numeral 2 illustrates the upper end of the drive shaft of the stopper.

In a known manner, shaft 2 is driven by an auxiliary shaft or operating shaft 3, whose rotation is determined in one direction by action on a lever 4, and in the other direction, by a spiral spring 5.

The spring 5 is connected at one of its ends to shaft 3, and at another end to a casing affixed to body 1 of the valve by the intermediary of screws, whose axes are diagrammatically represented by the reference numeral 6.

The casing is constituted by two portions 7 and 8 assembled by screws, whose axes are diagrammatically represented by reference numeral 9. Insofar as the adjustment of the initial tension of the spring is concerned, reference is made to the above-discussed French published patent application No. 2,640,024.

According to the invention, shaft 3 drives a piston 10 housed in a recess 10a at the bottom of portion 8 of the casing. The recess is blocked, in a sealed manner, by a cover 11 arranged against the bottom of portion 8. Cover 11 may be fixed by means of screws (not represented).

The recess 10a, the piston 10 and cover 11 define four variable volume chambers 12a, 12b and 13a, 13b, containing a viscous liquid, such as grease.

Figure 2:
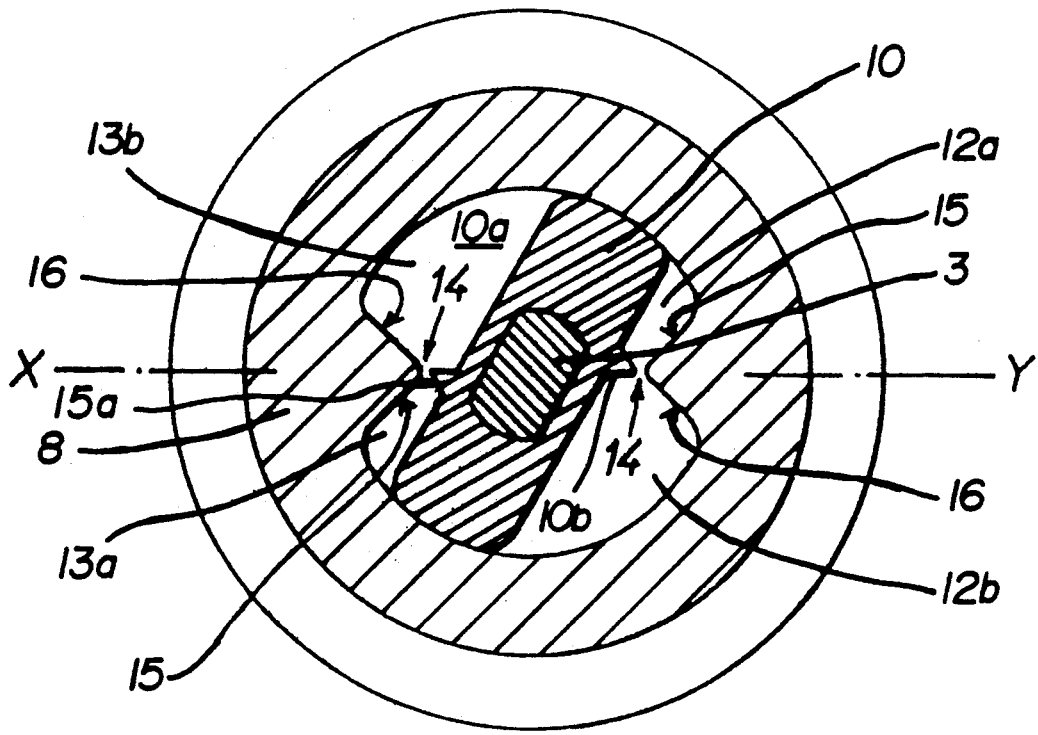
FIG. 2 is a sectional view along line II—II of FIG. 1.

As is apparent from FIG. 2, the profiles given to the recess 10a and to the piston 10 are such that during rotation of the piston, and especially at the end of its path, chambers 12a and 12b, as well as chambers 13a and 13b, communicate with each other by an opening 14 whose section is substantially reduced. Reduced opening 14 may be formed by protrusions 10b on the piston 10 cooperating with apex 15a where sides 15 and 16 intersect.

The reduced section of opening 14 has the effect of slowing the passage of the fluid from one chamber to the other, and consequently, of slowing the rotation of shaft 3.

It must be noted that this action takes place whatever the direction of rotation of shaft 3. The device according to the invention thus has the advantage of protecting the device against too rapid a release of the spring. The protection is equally efficient in case of too sudden an action on lever 4.

It should also be noted that although the rotation of portion 7 with respect to portion 8 modifies the tension of the spring, this action has no effect on the position of lever 4, which, in an open position, must extend parallel to the axis of the valve diagrammatically represented by XY in FIG. 2.

In this position, piston 10 is in support against sides 15 of chambers 12a and 13a. In a closed position, piston 10 is in support against sides 16 of chamber 13a and 13b.

It is clear from this explanation that piston 10 also constitutes a mobile stop, limiting the rotation of lever 4 to substantially 90° in the illustrated embodiment.

Figure 3:
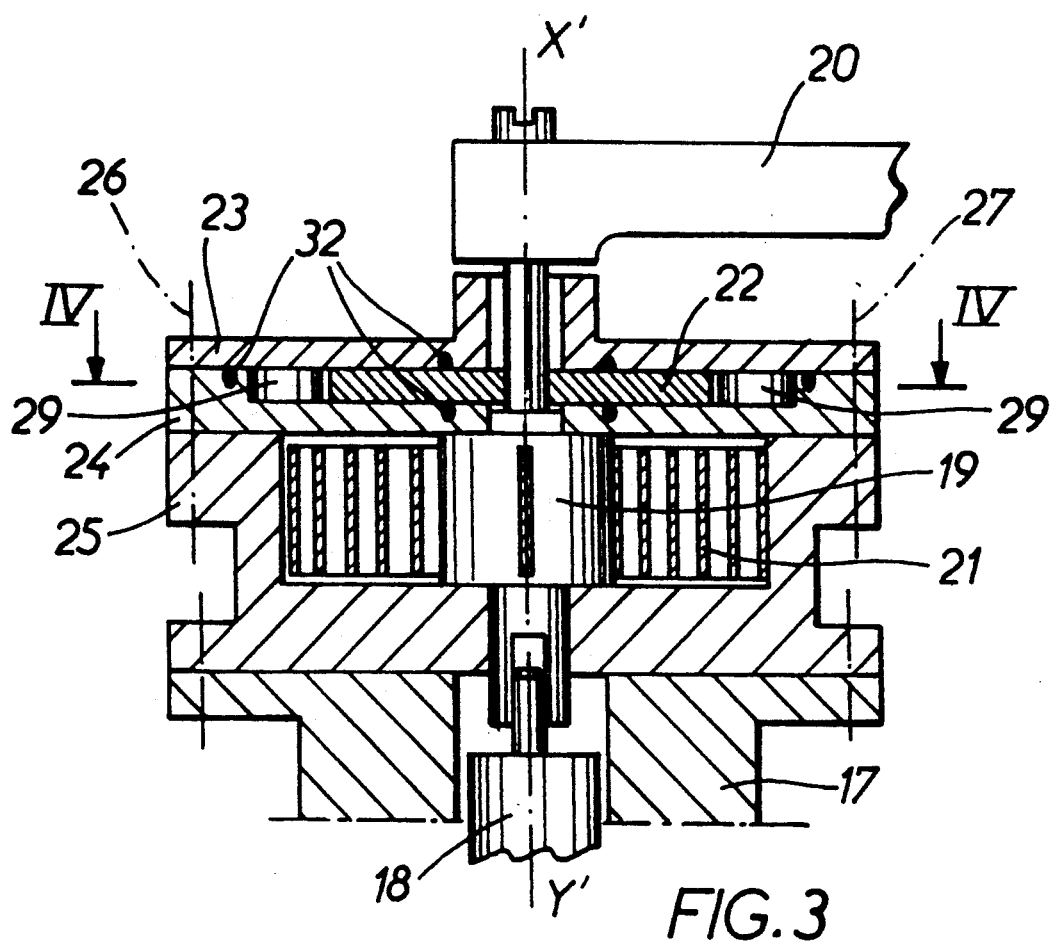
FIG. 3 is a view similar to FIG. 1, representing another embodiment.
Figure 4:
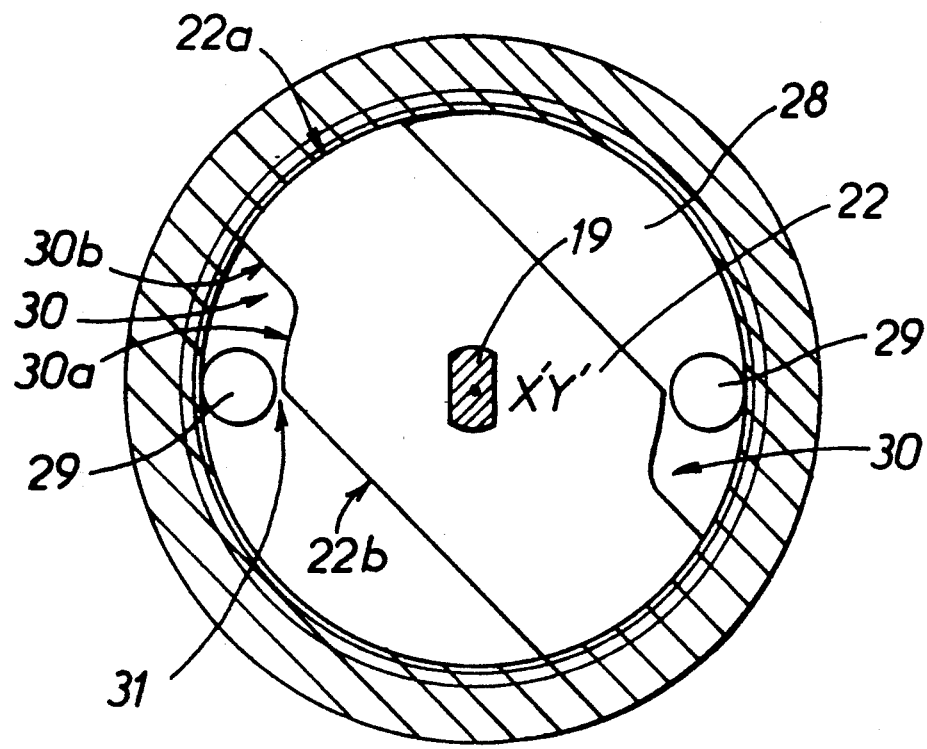
FIG. 4 is a sectional view, along line IV—IV of FIG. 3.

FIGS. 3 and 4 illustrate another embodiment of the present invention.

In accordance with FIGS. 3 and 4, it can be seen that reference numeral 17 diagrammatically represents the body of the valve and that reference numeral 18 constitutes the upper end of the drive shaft of a stopper (not represented).

The shaft 18 is driven by an auxiliary shaft or an operating shaft 19, whose rotation is determined in one direction by action on lever 20, and in the other, by the release of a spiral spring 21, similar to that referenced by 5.

Spring 21 is housed in a casing, constituted of two portions, and shaft 19 is rotationally linked to a piston 22.

According to another characteristic of the invention, piston 22 is positioned in a casing, constituted of two portions 23 and 24 in which the lower portion 24 forms the cover of portion 25 enclosing spring 21. Portions 23, 24 and 25 are assembled by screws whose axes are represented by references 26 and 27 in FIG. 3.

Portion 24 has a circular recess 28, centered on axis X'Y' of shaft 18, containing a viscous fluid and in which piston 22 is able to turn.

As is apparent from the drawings, piston 22 is constituted by a disk, that adjusts itself in the bore of recess 28, truncated along two parallel lines.

The rotation of piston 22 is limited by two pins 29 attached against the periphery of recess 28. Since the fixing of these pins does not pose any problem, it is not represented in the drawings.

Piston 22 has two cutouts 30. Each cutout is located on the angle joint of the circular edge 22a of the piston and of one of its rectilinear edges 22b. Portion 30a of the cutout is circular and is substantially concentric to edges 22a.

Pins 29 and piston 22 define, in the recess 28, four chambers communicating among each other in pairs by the intermediary of a space 31, whose reduced section is kept strictly constant at the end of the path of the piston.

The housing enclosing piston 22 is rendered sealed by the intermediary of wedge type seals such as those referenced by 32.

Although the invention has been described with reference to particular means, materials and embodiments, it is to be understood that the invention is not limited to the particulars disclosed and extends to all equivalents within the scope of the claims.

I claim:

1. Control device for a valve, comprising:
   a drive shaft adapted to be associated with a stopper;
   a spiral spring whose release brings about rotation of said drive shaft; and
   a shock absorbing device including a rotating auxiliary shaft which drives a rotating piston positioned in a sealed housing enclosing a viscous fluid, and said sealed housing includes a casing comprising an upper portion and a lower portion, and said lower portion forms a cover for said casing which encloses said spiral spring.

2. Control device according to claim 1, wherein said sealed housing comprises, in cooperation with said rotating piston, four chambers that communicate among each other in pairs by an opening whose section is reduced so as to brake passage of said viscous fluid from one chamber to another chamber.

3. Control device according to claim 2, further comprising a casing including an upper portion and a lower portion enclosing said spiral spring, said lower portion including a bottom, and said sealed housing comprises a recess at the bottom of said lower portion of said casing blocked by a cover fixed against the bottom of said lower portion.

4. Control device according to claim 1, including at least one pin for limiting rotation of said piston.

5. Control device according to claim 4, wherein said piston includes two circular edge portions and two rectilinear edge portions, and at least one cutout located on an angle joint formed by one of said two circular edge portions and one of said two rectilinear edge portions.

6. Control device according to claim 5, wherein said at least one cutout includes a circular edge which is concentric to said circular edge portions so as to from a reduced space between said circular edge and said at least one pin at an end portion of rotation of said piston.

7. Control device according to claim 1, wherein said lower portion includes a circular recess, said piston comprises a disk within said recess, with said disk being truncated along two parallel lines.

8. Control device according to claim 7, including at least one pin for limiting rotation of said piston, and said at least one pin being attached against a periphery of said recess.

9. Control device according to claim 8, wherein said piston includes two circular edge portions and two rectilinear edge portions, and at least one cutout located on an angle joint formed by one of said two circular edge portions and one of said two rectilinear edge portions.

10. Control device according to claim 9, wherein said at least one cutout includes a circular edge which is concentric to said circular edge portions so as to from a reduced space between said circular edge and said at least one pin at an end portion of rotation of said piston.

11. Control device according to claim 1, wherein said shock absorbing device includes means for limiting rotation of said rotating piston.

12. Control device according to claim 11, further including means for reducing a flow path of viscous fluid in said sealed housing.

13. Control device according to claim 12, wherein said means for reducing a flow path comprise a configuration on said piston cooperating with said means for limiting rotation.

14. Control device according to claim 13, wherein said means for reducing a flow path comprise at least one protruding portion on a wall of said sealed housing, and at least one protrusion on said piston.

15. Control device according to claim 13, wherein said means for reducing a flow path comprise at least one pin positioned at a periphery of said sealed housing and at least one cutout on a periphery of said piston.

16. Control device according to claim 15, wherein said sealed housing has a circular cross-section, and said at least one cutout includes a circular portion.

17. Control device according to claim 1, further including a lever attached to said auxiliary shaft.

* * * * *